May 7, 1946.　　H. O. SCHJOLIN　　2,399,709
TURBO DRIVE AND CONTROL
Original Filed Feb. 9, 1938　　4 Sheets-Sheet 1

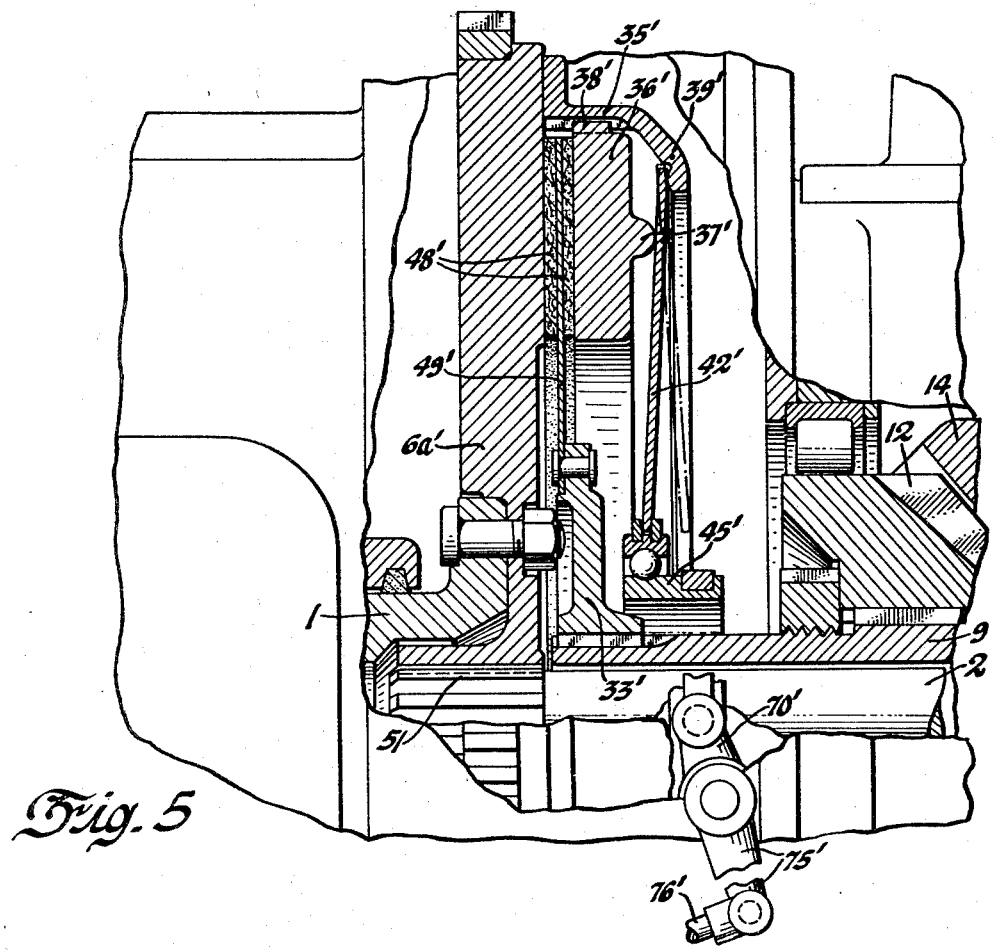

Patented May 7, 1946

2,399,709

UNITED STATES PATENT OFFICE 2,399,709

TURBODRIVE AND CONTROL

Hans O. Schjolin, Birmingham, Mich., assignor, by mesne assignments, to General Motors Corporation, Detroit, Mich., a corporation of Delaware Original application February 9, 1938, Serial No. 189,596. Divided and this application January 9, 1942, Serial No. 426,223

15 Claims. (Cl. 180—54)

This is a divisional application of my U. S. S. N. 189,596, filed February 9, 1938, and maturing February 10, 1942, as U. S. 2,272,434.

The invention relates to motor vehicles, and more particularly to an improved compact grouping of the driving mechanism for large, heavy vehicles such as buses, trucks and tractors.

In passenger buses in particular it is essential to arrange the drive mechanism in a space which shall detract the least from the pay load space, and while vehicles having transversely mounted power plants at the rear are known in the art, the present invention embodies a specific, improved arrangement, which, while including structures for the most part in general use and of conventional character, my arrangement imparts the drive to the vehicle wheels through a system which provides the least wastage of effort in power conversion from a transversely driving and torque converting assembly, in that the final output shaft receives its drive from the main centerline of the primary drive assembly.

A novelty herein is the final drive arrangement of a torque-multiplying transmission in the above noted form of drive, so that there is the least wastage of axial space consumed by the primary power group; the added utility of providing for accessibility for replacement and assembly of the groups, and the novel nature of the power plant combination which provides adequate accessory unit drive at the end of the primary power group remote from the engine.

It is an object of the present invention to provide an arrangement of engine, transmission elements, final drive shaft, differential mechanism and coupling means effective to yield substantial support for the torque of a heavy vehicle, accomplished by locating the output shaft in direct line forward of the transversely mounted power plant close to the longitudinal center of the vehicle, and gearing it directly with hollow shafting driven by a central power shaft, to be coupled directly with the power shaft when it is desired that the gearing be idle, or non-driving. An advantage derived from this arrangement, other than the close coupling of the torque-transmitting elements for better support is the saving in space, especially transverse space, by telescoping a portion of the change speed drive control within the dimensions of the final drive conversion gear, shown in the example as a bevel gear.

A further object is the utilization of space-saving forms of clutches for the direct and for the reduced speed ratio drives wherein short-throw loading springs of discoidal type are provided in each of said clutches in the above-noted assembly of drive-transmitting parts, wherein effective control of the drive is accomplished by actuation and control elements having their maximum control movement external to the housing containing the said assembly, with corresponding short motions within the said housing where longer motions of the clutch operating mechanism would unnecessarily consume needed space.

An additional object is to provide in the above described assembly an accessory drive means for delivering power, to equipment such as fans and the like for ventilation of the rear-engine compartment, the means being placed at the end of the assembly remote from the engine.

Further objects in the application of operator-operated interlocking controls for the above forms of driving mechanism are achieved such as drive control and actuation means connected with fluid pressure servo devices to accomplish the shifts of drive between direct and converter positions.

Additional objects and advantages will appear in the following detailed description when considered in connection with the accompanying drawings wherein:

Figure 5 is an elevation-section view of a friction clutch used as a modification of the direct drive clutch of Figures 2 and 4, and identical in construction with the friction clutch C of Figure 2.

Figure 1:
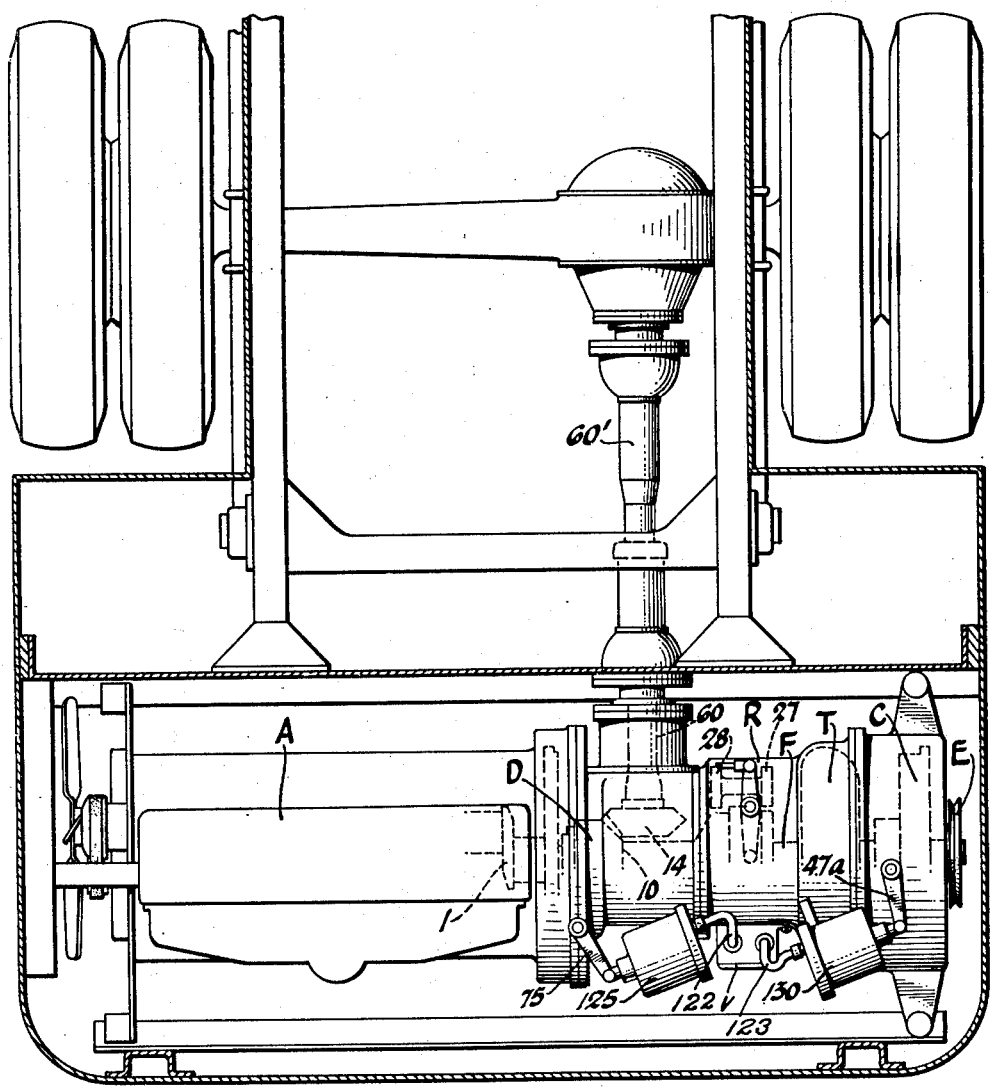
Figure 1 is a schematic view of my invention, as applied to a motor vehicle such as a bus, wherein the power plant is arranged transversely at the rear.

Referring particularly to Figure 1, it will be seen that my arrangement is shown as installed in the rear of a bus, with the primary power plant arranged transversely, and the output drive in the fore-and-aft plane of the vehicle, connecting by a short jackshaft near the longitudinal axis to the conventional differential gear and axle drive to the rear wheels, placed forward of the power plant.

The primary power plant comprises an engine A of suitable type, a clutch C, a clutch D, a turbine type torque-converter T as a variable speed transmission, a gear assembly R, an overrunning device F, and an accessory drive mechanism E, all mutually coaxial.

The propeller shaft 60' extends forwardly with respect to the vehicle, and downwardly, from a point intermediate the engine A and the torque-converter unit T, connecting to the conventional differential gear, as noted. The clutch servo cylinders 125, 130 provide the actuation force for clutches C and D, controlled by appropriate valving in valve box V.

Figure 2:
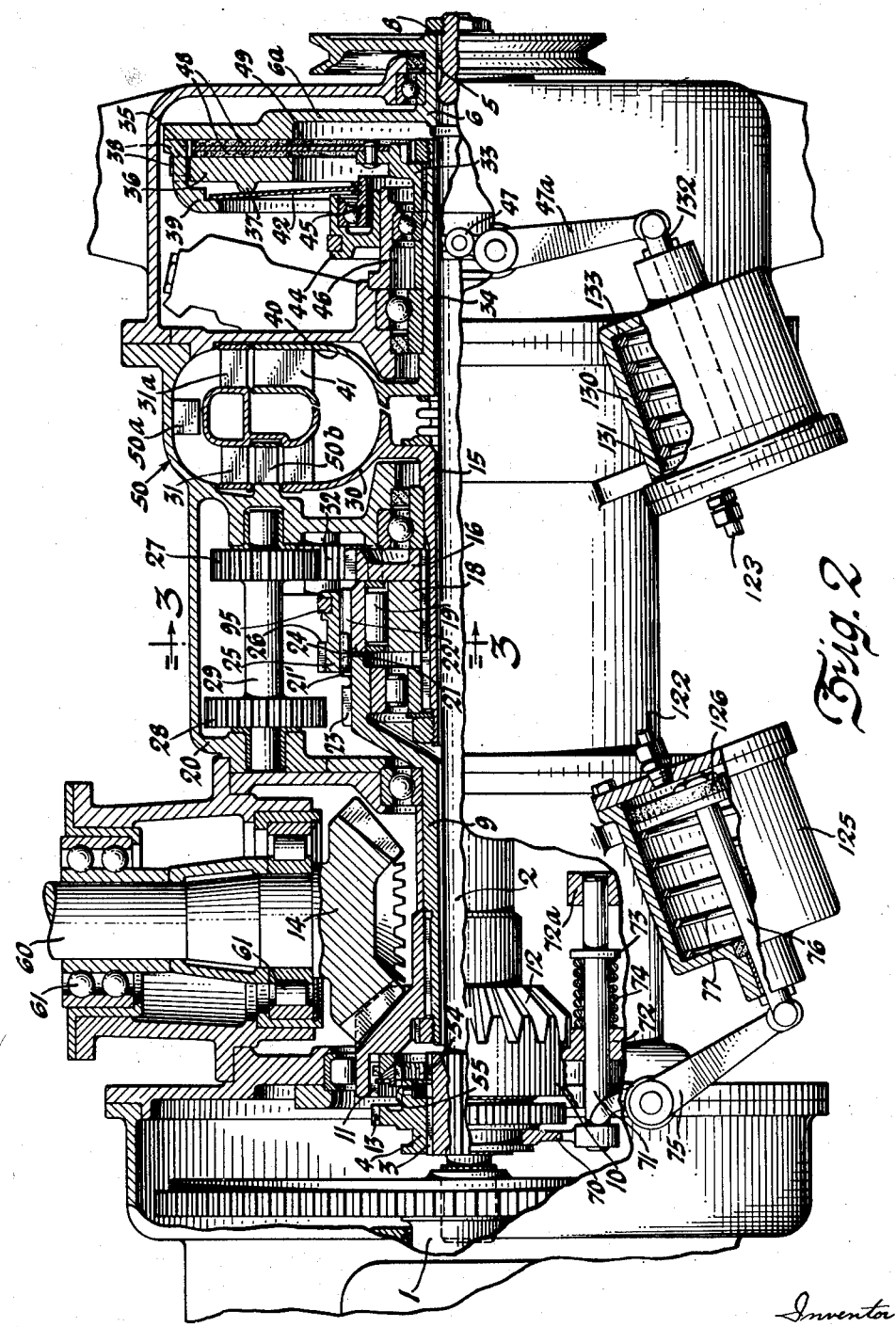
Figure 2 is a longitudinal section of the primary power plant and driving assembly taken in a longitudinal plane of Figure 1.

In Figure 2 the engine crankshaft is shown at 1, mounted to rotate power shaft 2 splined at 3 for slider 4, and splined at 5 for hub 6 and flange fitting 8.

Hollow shaft 9 mounted on bearings, surrounds power shaft 2 and is attached to or integral with member 10, which has internal ring of teeth 11 and external bevel teeth 12.

The teeth 13 of slider 4 mesh with 11, whereupon member 10 is driven at engine speed.

Output jackshaft 60 rotating in bearings 61 in casing 20 is fixed to or integral with bevel gear 14 meshing with gear 12, transmitting the drive of shaft 9 to the driving wheels of the vehicle, as shown in Figure 1.

The accessory drive pulley E may operate a fan, a pump, an air-conditioning apparatus, or the like, in accordance with the purposes to which the vehicle is designed. It will be noted that flange fitting 8 is driven directly from the engine shaft 1 through shaft 2. No claims are herein made, with respect to such accessory mechanisms as may be chosen to be driven from member 8.

Shaft 15 concentric with shaft 9 is bearing-mounted on shaft 2 and has affixed gear 16 and roller clutch race 18, its inner end terminating in turbine element 30, which is the output member of the turbo torque-converter T. The outer roller clutch member 21 is externally splined at 22, and teeth 23 and spline 24 of shaft 9 are aligned axially and radially therewith. Bridging slider 25 is splined internally at 21' so that when these teeth are in mesh with the teeth 23 of shaft 9, the outer member 21 of the roller clutch assembly F is released by release of teeth 22 from internal teeth 21' of the slider 25. External teeth 26 of slider 25 are arranged to mesh also in the leftward position with the teeth 28 of gearbody 29 rotating in appropriate bearings in casing 20. Teeth 27 of gearbody 29 constantly mesh with reverse idler gear 32, which in turn mesh with gear 16. When slider 25 is in the right hand position of the figure, the drive from shaft 15 is through roller clutch members 18 and 21 to slider 25, since internal splines 21' are then meshed with teeth 22 and thence from slider 25 to shaft 9, yielding "forward" drive. When the slider 25 is in the left hand position from that shown in Figs. 2 and 3, the drive is through gears 16—32, gearbody 29, slider 25 and shaft 9 through the described toothed elements, yielding "reverse drive," which is obvious from the pairing of the gearing.

The gear group 16—32—27—28 rotates with shaft 15 whenever the torque converter T is driving, as well as member 18 of the roller clutch. Slider 25 in the right hand position of Fig. 2 rotates with the outer drum 21 of the freewheel clutch and its teeth 21' mesh with teeth 23' of sleeve 9 to transmit direct drive. In the leftward position of slider 25 external teeth 26 mesh with gear 28 and teeth 21' mesh with teeth 23 of shaft 9, so that the slider provides clutching action for forward direct drive between shafts 15 and 9 and connects the geared drive between them for reverse.

The hub 6 is one member of the turbine driving clutch C, and hub 33 is the other, splined on hollow shaft 34, integral with the input or impeller member 40 of the torque converter T.

The blades 50a and 50b are integral with reaction member 50 attached to, or integral with casing 20.

The rotation of impeller 40 causes the liquid contained in the casing to impinge on the blades 31a against which the liquid is thrown by centrifugal force from buckets 41 of the impeller 40. The specialized contour of the blades 50a and 50b permits the liquid to apply a rotational force to output-connected blades 31 and 31a mounted in rotor 30 attached to shaft 15.

The multiplication of torque achieved in the turbine by virtue of the presence of the reaction members 50a and 50b is a well-known effect, described in U. S. 1,199,359 to Föttinger, filed June 19, 1906, issued September 26, 1916; and no invention is herein claimed for this characteristic.

It is deemed sufficient to state that the three elements of the turbine device constitute a transmission which converts torque at one input speed to a greater torque at a lower speed imparting a variable speed to shaft 15 from shaft 34 rotating at engine speed.

When clutch C is engaged, the drive of the engine is transmitted to jackshaft 60 through the device T at variable torques and speeds.

When clutch D is engaged and clutch C released, the drive is transmitted at a fixed ratio from engine shaft 1 to jackshaft 60; whereupon both members, input hollow shaft 34 and output hollow shaft 15 of the torque converter T may come to rest, since roller clutch F permits shaft 9 to overrun shaft 15.

Figure 3:
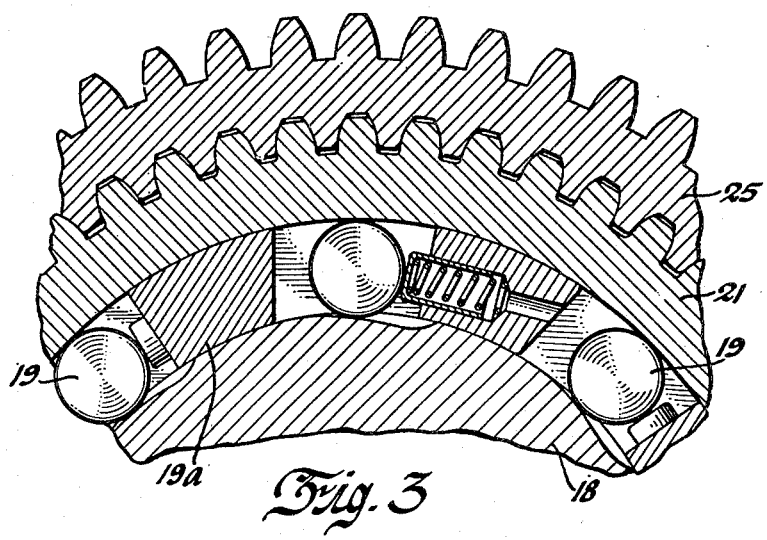
Figure 3 shows the sectional detail of the form of one-way clutch utilized in the assembly of Figure 2 on line 3—3, with shifter engaged.

The detail of roller clutch F is shown in Figure 3, and since this type of structure is well known, no lengthy description of its operation is believed necessary in the demonstration of my invention. The arrangement of the outer member 21, inner member 18, shaft 15, and slider 25 provides means for obtaining a full release of the roller clutch F when the slider 25 is placed in the "reverse" position, permitting the saving of power plant length by mounting the transfer control for forward, reverse and neutral drive between the toothed ends of the gearbody 29.

The inner face of the outer member 21 is a smooth race for rollers 19 carried in cage 19a rotating with the inner one-way cam member 18. The rollers are biased by appropriate means, for one-way locking of members 18 and 21. The cage 19a has limited lost motion with respect to member 18.

The neutral position of the slider 25 occurs when the teeth 21' are demeshed from spline teeth 22 of element 21, partially meshed with teeth 23; but without mesh between teeth 26—28.

Figure 4:
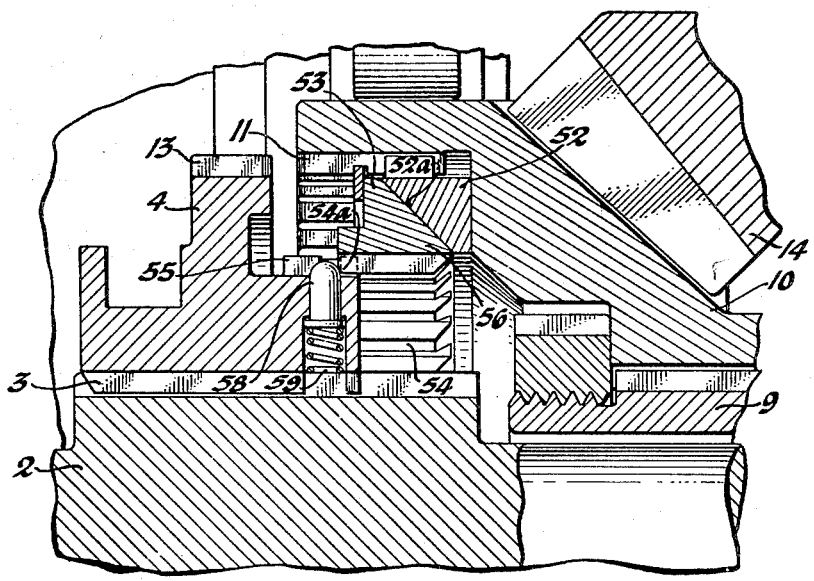
Figure 4 is an enlarged view of the direct drive clutch D of Figure 2.

The detail of one form of clutch D is shown in Figure 4 where slider 4 splined at 3 to shaft 2 may mesh its teeth 13 with teeth 11 of bevel gearbody 10. Inside the overhang of teeth 11 is located friction ring 52, locked to rotate with member 10, and presenting tapered friction face 52a.

Balk piece 53 is splined at 54 to an extension of slider 4, for limited rotational motion with respect to slider 4. Auxiliary teeth 54a—55 cut on slider 4 are spaced to accommodate poppets 58, which are loaded radially by springs 59 in the radial recesses shown. The poppets 58 transmit axial force on slider 4 toward mesh of teeth 13—11, to the adjacent edge of spline teeth 54a of balk piece 53, so that registry of the teeth of 54—55 will coincide with release of drag force, permitting 13—11 to mesh without clash. Additional force is needed to depress the poppets for completion of mesh.

Piece 53, because of friction contact of its ring 56 with ring 52 at 52a, may rock positively or negatively on the splines 54, so that teeth 54a of piece 53 will be out of register with teeth 55, the teeth ends abutting, preventing further motion toward mesh of slider 4 and teeth 13.

If the faster rotating member be the engine shaft 1, the balking piece 53 will rotate positively due to friction drag, to set up rejection of mesh. If output connected member 10 be the faster member, in either case there is rejection of mesh until the drag force acting on piece 53 disappears, as it does at synchronism, when the slider 4 may now move, teeth 55 may enter spline teeth 54a of piece 53, and also teeth 13 mesh with teeth 11, whereupon direct drive between shaft 1 and member 10 is accomplished.

During a synchronous rotation of slider 4 and member 10, the opposing force condition persists, until synchronism is reached. Then the drag force from ring 52 to ring 56 disappears, which because of the release of the balking action, permit further free travel toward mesh, thereby allowing teeth 13—11 to complete meshing engagement.

This is described as a form of synchronism responsive mechanism having a balking, or rejection-of-mesh characteristic, wherein the friction and camming forces are provided to control the mesh motion rather than to absorb the differential inertias of the engine and vehicle. The characteristic may be described as a friction balking or lock-out action arranged to permit mesh or reject mesh, according to synchronous or asynchronous rotations of the two members to be connected for unitary rotation.

If the driver allows engine speed to fall off below synchronism before the shifting force is exerted on the slider 4, the relative rocking action of balk piece 53 is reversed, and the device rejects mesh because of the lag of teeth 55 with respect to teeth 54. The operator need therefore only bring the engine speed up to synchronism by depression of the accelerator pedal, whereupon, as before, the completion of mesh is permitted.

As will be seen, this form of synchronism responsive device is needed for clutch D to operate correctly in combination with the controls for the variable speed ratio device.

The form of clutch C shown in Figure 2 is that of a single-plate friction clutch in which flange 6a of hub 6 affixed to the shaft 2 terminates in drum 35 in which presser plate 36 is allowed limited longitudinal motion on splines 38. Disc spring 42 held by ring 39 to drum 35 extends inwardly toward hub 33 splined on shaft 34, and may engage projection 37 of presser plate 36. The inner portion of spring 42 engages sleeve 45 movable longitudinally so as to shift the inner part of the spring 42 to either side of its critical flexion position with respect to the clamped outer edge.

When the sleeve 45 is positioned to the right, as in Figure 2, the external force applied to sleeve 45 shifts spring 42 through its critical flexure position, whereupon the force of the spring is exerted on projection 37, tending to load presser plate 36. Hub 33 carries the driven element 49 of clutch C to which the customary facing discs 48 are affixed. When plate 36 is loaded, clutch C transmits the drive of shaft 2 to the input member 40 of the torque converter T, at a given clutch capacity.

When an applied external force shifts sleeve 45 to the left, the spring 42 is anew flexed through the critical position, and its force is dissipated in holding the presser plate 36 free from load, thus declutching clutch D.

It should be noted that the external force to be applied to sleeve 45 need only be effective to carry the spring 42 through the critical mid-position, and that no external force thereafter is needed to hold the clutch C engaged or disengaged.

External controls for clutches C and D, alternating their engagement, may therefore connect the drive for variable speed and torque through the converter unit T, or for fixed ratio or "direct" drive.

In Figure 5 the clutch assembly D takes the form of a friction clutch, identical in operation with that of the clutch just above described, and shown as connecting power shaft 2 and shaft 9. The prime-numbered elements of Figure 5 correspond to the parts described above in conjunction with the turbine driving clutch C of Figure 2.

The single plate friction clutch of Figure 5 has flywheel member 6a' affixed to shaft 1, and terminates in drum 35' in which presser plate 36' is allowed limited longitudinal motion on splines 38'. Disc spring 42' held by ring 39' to drum 35' extends inwardly toward hub 33' and may engage projection 37' of presser plate 36'. The inner portion of spring 42' engages a projecting portion of sleeve 45' movable longitudinally so as to shift the inner part of the spring to either side of its critical flexion position with respect to the clamped outer edge. When the sleeve 45' is positioned to the left in Figure 5, the external force applied to sleeve 45' shifts spring 42' through its critical flexure position, whereupon the force of the spring is exerted on projection 37', tending to load presser plate 36'. Hub 33' supports the element 49' of the clutch to which the facing discs 48' are attached. When plate is loaded, the clutch transmits the drive of shaft 1 to the hub 33', which being splined on shaft 9, couples the engine to bevel gear 12 to drive gear 14 and jackshaft 60.

Referring back to Figure 2, the collar of slider 4 is intersected by fork 70 affixed to rod 71 having sliding bearing in casing extensions 72 and 72a. Lock ring 73 retains biasing spring 74 which normally urges slider 4 toward engagement of teeth 13—11. Rocker lever 75 pivoted on the casing is arranged to load the slider 4 for disengagement through piston rod 76 and piston 126 of air cylinder 125 mounted on the casing 20 when air is admitted to pipe 122, to overcome the tension of return spring 77.

The valve box V in Fig. 1 is connected to servo piping 122, 123 for the cylinders 125, 130 and may contain control valving such as shown in Figures 6 and 7 of the applicant's United States Letters Patent No. 2,272,434, issued Feb. 10, 1942.

At the right of Figure 2, the casing 20 is shown broken away to disclose the external control applied to collar 44 which moves clutch sleeve 45 splined on casing extension 46. Fork 47 pivoted to the casing 20 is moved by its external lever 47a pivoted to piston rod 132 attached to piston 131 of cylinder 130 mounted on the casing 20. When fluid pressure is admitted to pipe 123 and cylinder 130, collar 44 and sleeve 45 are moved toward the left. When fluid pressure is released therefrom, return spring 133 in cylinder 130 shifts collar 44 and sleeve 45 to the right. The servo actuation means are shown schematically, and may be so disposed in the engine compartment space as engineering requirements demand. The detail of the servo control system is given further in my application for United States Letters Patent Serial No. 189,596, filed February 9, 1938, which has matured into the aforesaid Patent No. 2,272,434.

The prime-numbered elements in the lower half of Figure 5 refer to identical parts in the control for clutch D of Figure 4, the general arrangement for Figure 5 being identical with that for clutch C of Figure 2.

In the case of the arrangement of Figure 5 where the jaw clutch of Figure 4 is supplanted by the friction clutch for direct drive, the sleeve 45', which stresses spring 42', is arranged so that when servo pressure in cylinder 125 is exerted, the spring 42' is positioned to flexibly load projection 37' of pressure plate 36'. When the fluid pressure is relieved, spring 77' may overcome the force of 42' and disengage the clutch D.

When the operator is driving the vehicle in direct drive, the fluid pressure is therefore maintaining the sleeve 45' of the clutch D in engaged position, and clutch C is disengaged. If there be a demand for acceleration at a lower speed ratio than 1 to 1, the operator manipulates the control valving for "torque converter" operation, and spring 42' is shifted by spring 133, flexing away from the presser plate 36', so that clutch D of Figure 5 becomes disengaged.

When the operator control reaches the "torque converter" position, the servo pressure is cut off from cylinder 130, and spring 42 of clutch C is shifted so as to load the presser plate 36, and thereby establish drive through the clutch plate 48 and the torque converter T of Figure 2.

The relative biasing combination shown for the clutches for engagement and disengagement is believed to be novel, providing advantages in smooth operation, safety and the ability to maintain operation regardless of failure, since for example, the clutch biasing arrangement provides for converter drive even if the fluid pressure servo source fail, among other features described herein.

Further modification may be made of the relative action of the clutch control members with respect to the inherent characteristics of the disc spring actuating clutch controls, without departing from the scope of my invention.

The preceding description is believed to encompass certain of novel features, among which are the synchronized direct engine coupling of Figures 2 and 4, the control combination for the shifter mechanism which alternates drive between clutches C and D, the novel arrangement of the friction clutch loading and unloading means in conjunction with the alternating power control, and the free release mechanism involving the one-way clutch whereby the turbo-driven element may be brought to rest.

It is believed that the foregoing specification clearly sets forth the advantages to be gained in the novel arrangement which provides direct lateral output shaft drive from a transversely mounted rear power plant, leading forward and down to the driving axle differential, which provides space saving in the transverse axis by the use of short-throw disc-spring clutches for direct and reduction drive; and which provides power take-off means for accessory appliances such as fans and the like, at the end of the transverse assembly remote from the power plant.

From the foregoing, it is apparent that a number of related novelties embodying invention in combination are herewith disclosed. Changes in the specific arrangements and forms of the structures may be made without departing from the spirit and scope of my invention, said invention being limited only by the scope of the appended claims.

Having thus described my invention, what I claim as new and desire to secure by Letters Patent is:

1. In a power transmission assembly, for motor vehicles in combination, an engine shaft, a variable speed ratio transmission mounted to rotate concentrically with said engine shaft, a clutch device connecting said transmission with said shaft, operating means for said device, a power receiving shaft concentric with said engine shaft, a gearing unit arranged to transmit drive between said transmission and said power receiving shaft, in alternate driving paths one of which provides a one-to-one ratio, manual selecting means for said unit, a final-drive shaft intersecting the centerline of said engine shaft and said power receiving shaft and bevel geared to the latter shaft, and a shiftable coupling controlled by said operating means adapted to drive said power receiving shaft directly from said engine shaft when said clutch device is disconnected.

2. In power driven vehicles, in combination, a vehicle frame, an engine arranged transversely in said frame and fixedly connected to one end of an extension shaft coaxial therewith, a hollow power receiving shaft surrounding a portion of said extension shaft, and concentric therewith, a variable speed ratio transmission including fluid torque conversion means mounted concentric with said shafts and adapted to transmit drive to said power receiving shaft, a controllable clutch device concentric with said shafts effective to couple said transmission with the other end of said extension shaft whereby the drive of said extension shaft is transmitted to said power receiving shaft through said transmission, a load shaft adapted to drive the wheels of the vehicle arranged to intersect the centerline of said extension shaft and said power receiving shaft, said load shaft being driven by said power receiving shaft, and selective coupling means effective to drive said power receiving shaft directly from said extension shaft or to drive it indirectly from said extension shaft and said transmission by coupling of said clutch device.

3. In a rear engine drive vehicle, a transversely disposed power plant including a transversely mounted engine with a transmission housing attached to one end of the engine and supporting a power shaft fixed to the shaft of said engine, a load shaft extending into said housing from one side thereof, a hollow driven shaft bevel-geared to said load shaft, a countershaft and gearing affixed thereon, one gear thereof being adapted to transmit drive to said driven shaft, a second hollow shaft having a gear arranged to transmit drive to said countershaft and adapted to transmit power derived from rotation of said power shaft, disengageable coupling means for connecting said power shaft directly with said driven shaft and additional disengageable coupling means for transmitting power from said power shaft to said second hollow shaft for driving said driven shaft and said load shaft at reduced speed ratios when said first named coupling means is disengaged.

4. In a rear engine drive vehicle, a rear axle having a rearwardly facing differential mechanism, an engine disposed transversely of the vehicle and rearwardly of said axle, a power shaft fixedly coupled to the shaft of said engine, a transmission assembly including a hollow driven shaft and a countershaft having geared relationship with said driven shaft said assembly including alternately operable clutching means, a second hollow shaft adapted to be driven from said power shaft through one of said clutching means and having a drive gear for driving said countershaft, a bevel gear on said driven shaft, an output shaft connected to drive said differential mechanism and having a bevel gear meshing with the said driven shaft bevel gear, another of said clutching means being adapted to couple said power shaft directly to said driven shaft when said first named clutching means coupling said transmission assembly and said power shaft is disconnected, and control means adapted to establish drive by either of said clutching means, or to render both incapable of driving.

5. In combination a power plant arrangement consisting of an engine, a transmission housing attached to said engine at one end thereof, a power shaft extending through said housing driven constantly by said engine as an extension of the shaft of said engine, a load shaft extending into said housing at a lateral angle at a point adjacent the attachment of said power and said engine shafts, a first hollow driven shaft supported in said housing coaxial with said power shaft and having a countershaft driving gear affixed thereto as a power output member, a countershaft gear train arranged to be driven by said member, bevel gear means arranged to drive said load shaft, a second coaxial hollow shaft adapted to transmit the drive of said engine driven power shaft to said bevel gear means or to transmit the drive of said first named hollow shaft directly or indirectly thru said train to said means, controllable coupling means for connecting said power shaft with said second hollow shaft, and a variable speed ratio transmission assembly in said housing and including said train for driving said first named hollow shaft from said power shaft and embodying means for driving said second hollow shaft directly from said first named hollow shaft.

6. In the combination set forth in claim 5, the sub-combination of an external accessory drive means driven from the extension of said power shaft through the end-wall said housing remote from said engine.

7. A transmission arrangement for a rear engine drive vehicle comprising an engine, an engine shaft a power shaft consisting of an extension of said engine shaft, a hollow driven shaft with one end adjacent said engine and adapted to be coupled to said power shaft by clutch means located at said adjacent end, a second hollow shaft, ratio change means including a hydraulic turbine transmission for driving said first from said second hollow shaft and including additional clutch means for coupling said power shaft to drive said transmission, and control means for said first and said second named clutch means operable to render them alternately coupled so as to drive said first named hollow driven shaft at unit speed with said power shaft or to drive it at variable speed ratio through said transmission.

8. In the combination set forth in claim 7, the sub-combination of an external accessory drive means driven from the end of said power shaft remote from said engine.

9. In a power drive assembly, in combination, an engine, an engine flywheel, a transmission casing attached to said engine, a power shaft fixedly and constantly connected to the flywheel of said engine and extending through the said casing, a load shaft supported laterally in one side of said casing and intersecting the centerline of said power shaft, a hollow transmission output shaft concentric with said power shaft and adapted to drive said load shaft through bevel gearing, a power transmission mechanism mounted in said casing and adapted to couple said transmission output shaft and said power shaft positively and directly or at reduced gradually variable speed ratio, said mechanism including controllable coupling means operable for establishing direct drive between said power shaft and said output shaft and additional coupling means to establish reduced speed ratio drive between the said shafts said coupling means being connected to the said power shaft and the said output shaft so that when the direct drive coupling means is effective the said reduced speed ratio coupling of said mechanism comes to rest, and control means effective to cause alternate actuation of said coupling means for establishing said direct drive while said reduced speed coupling comes to rest, or to establish said reduced speed drive.

10. In combination in a transmission housing, a first shaft extending through said housing, a coaxial tubular driven shaft supported in said housing and having a drive pinion gear formed on one end thereof, a disengageable coupling between said shafts, a second tubular shaft in said housing concentric with said first shaft, a second disengageable coupling between said second tubular shaft and said first shaft variable speed transmission means in said housing for driving said driven shaft from said second tubular shaft and from said first named shaft when said second coupling is engaged, a laterally directed output shaft journalled in one side wall of said housing, and bevel gear means between said driven shaft and the inner end of said laterally directed output shaft for transmitting variable speed drive from said transmission means to said lateral shaft and fixed ratio drive from said tubular driven shaft when said first named coupling is effective.

11. A power transmission device for an engine driven vehicle having a transversely mounted drive mechanism at the rear comprising; a transmission output hollow shaft, a hydraulic torque converter providing reduction speed ratio drive between the engine and the said shaft, a clutch for selectively coupling the converter to the engine, and drive control means including a mechanical high speed direct drive between the engine and the said shaft independently of said clutch or converter consisting of a releasable positive coupling having a driving section constantly connected to the engine during normal operation, with a driven section constantly connected to the said shaft during normal operation, actuating means for engaging the said coupling, with a blocking ring preventing engagement of said sections in response to operation of the actuating means except at synchronous speeds of said sections; the said hydraulic reduction speed ratio drive including a turbine member having a hollow output shaft part concentric with and adapted to deliver power in one direction of rotation only to said transmission output shaft, means including a reverse gear for transmitting power selectively in both directions of rotation to the said transmission output shaft at a point adjacent said turbine member, a high speed drive shaft extending through the turbine and hollow output shaft, a releasable clutch for selectively connecting the hollow output shaft to the turbine output shaft part or to said reverse gear, and an angle drive arrangement coupling the said transmission hollow output shaft to the vehicle axle including a bevel pinion rotating fixedly with the said hollow output shaft and including a bevel pinion for providing angle drive meshed with said pinion, and the said releasable positive coupling between the engine and the said hollow output shaft having its driven section fastened to or integral with a portion of said first named bevel pinion.

12. In combination, in a transmission housing, a first shaft extending through said housing, a coaxial tubular driven shaft supported within said housing and having a drive pinion gear formed on the end within said housing, a controllable coupling between said shafts one member of which is integral with said gear, a second tubular shaft in said housing concentric with said first shaft and journalled at one end in the adjacent portion of said tubular driven shaft carrying said gear, a variable speed transmission in said housing for driving said driven shaft from said first shaft at variable forward and at variable reverse reduction ratios, a selective control for said transmission, a laterally directed output shaft journalled in one side-wall of said housing with a bevel gear meshing with said pinion for transmitting the torque of said tubular driven shaft to said output shaft, and control means for said coupling effective to establish direct drive between said first two named shafts while disconnecting the drive of said transmission.

13. In combination, in a transmission housing, a first shaft extending through said housing, a coaxial tubular shaft rotatable within said housing having a drive pinion gear fixed on one end thereof, a clutch adjacent said pinion and adapted to couple said first shaft to said coaxial tubular shaft a second tubular shaft in said housing about said first shaft and journalled to maintain alignment with said first named tubular shaft and being piloted at one end at a point adjacent said first named tubular shaft, a variable speed gear unit in said housing for driving said second tubular shaft from first named tubular shaft at variable forward and reverse speed ratios, and a laterally directed output shaft journalled in one side wall of said housing with a pinion meshing with said first named pinion for transmitting the torque of said second tubular shaft to said output shaft.

14. In combination, in a transmission housing, a primary power shaft extending through said housing, a tubular load shaft surrounding a portion of and coaxial with said power shaft geared for transmitting torque, a second coaxial tubular shaft likewise surrounding a portion of said power shaft, an output shaft extending into said housing and bevel geared to said load shaft for transmitting the torque thereof, controllable coupling means connecting said power shaft and said second tubular shaft, positive coupling means adapted to connect the first and second named tubular shafts, and coupling means adapted to connect the said power shaft directly for unitary rotation with the said tubular load shaft when said second named coupling means is disconnected.

15. In combination, in a transmission housing supporting a plurality of shafts, a power shaft extending through said housing, a coaxial tubular load shaft surrounding a portion of said power shaft and having an output gear attached thereto, a coaxial tubular shaft surrounding an adjacent portion of said power shaft and piloted for alignment with said first named load shaft, and an output shaft having a centerline angularly intersecting the centerline of said power shaft and extending into said housing equipped with a gear meshing with the said load shaft gear, variable torque-transmitting means coupling said power shaft with said second named tubular shaft, coupling means adapted to connect said tubular shafts, a clutch adapted to connect said power shaft and said tubular load shaft directly, and controls extending into said housing for selective operation of said means and said clutch.

HANS O. SCHJOLIN.